United States Patent Office 3,840,494
Patented Oct. 8, 1974

3,840,494
PROCESS FOR PREPARING ACID ESTERS OF 4-PIPERIDINOL DERIVATIVES AND THEIR USE AS STABILIZERS
Keisuke Murayama, Syoji Morimura, Takao Yoshioka, Hideo Horiuchi, and Susumu Higashida, Tokyo, Japan, assignors to Sankyo Company Limited, Tokyo, Japan
No Drawing. Filed Jan. 25, 1972, Ser. No. 220,706
Claims priority, application Japan, Jan. 29, 1971, 46/3,165
Int. Cl. C08f 45/60; C08g 51/60
U.S. Cl. 260—45.8 N                 9 Claims

ABSTRACT OF THE DISCLOSURE

In the disclosed polymer composition, synthetic polymers, including poloylefin, polyvinyl chloride, polyvinylidene chloride, polyacetal, polyester and polyamide, are stabilized against photo- and thermal deterioration by incorporating therein monobasic, dibasic, tribasic or tetrabasic acid ester of 4-piperidinol derivatives in an amount sufficient to prevent such deterioration.

---

This invention relates to a new and improved process for the preparation of an acid ester of 4-piperidinol derivative and a new use of an acid ester of 4-piperidinol derivative.

More particularly, this invention is concerned with a process for the preparation of an acid ester of 4-piperidinol derivative having the formula

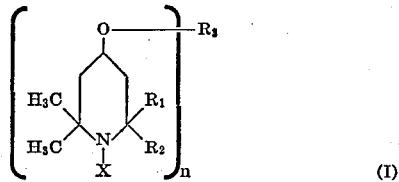

(I)

wherein $R_1$ and $R_2$ may be the same or different and represent an alkyl group of 1 to 4 carbon atoms or they may form, together with the carbon atom to which they are attached, a saturated alicylic group or the group of the formula

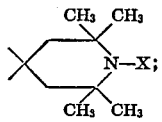

X is hydrogen atom, oxygen free radical (—O·) or an alkyl group of 1 to 4 carbon atoms;
$n$ is an integer of 1 through 4 inclusive; and
$R_3$ represents,
  when $n$ is 1, an acyl group derived from an aliphatic or aromatic monocarboxylic acid,
  when $n$ is 2, a diacyl group derived from an aliphatic or aromatic dicarboxylic acid or carbonyl group,
  when $n$ is 3, a triacyl group derived from an aliphatic or aromatic tricarboxylic acid or a trivalent group obtained by eliminating three hydroxyl groups from phosphoric acid, phosphorous acid or boric acid, and
  when $n$ is 4, a tetraacyl group derived from an aromatic tetracarboxylic acid or a tetravalent group obtained by eliminating four hydroxyl groups from orthosilicic acid.

This invention is also concerned with stabilization of synthetic polymers against photo- and thermal-deterioration thereof by having incorporated therein, in a sufficient amount to prevent said deterioration, at least one of a certain group of acid esters of 4-piperidinol derivatives having the formula

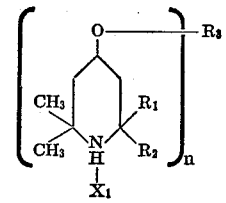

(II)

wherein $R_1$ and $R_2$ may be the same or different and represent an alkyl group of 1 to 4 carbon atoms or they may form, together with the carbon atom to which they are attached, a saturated alicyclic group or the group of the formula

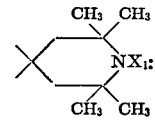

$X_1$ is hydrogen atom or an alkyl group of 1 to 4 carbon atoms;
$n$ is an integer of 1 through 4 inclusive; and
$R_3$ represents,
  when $n$ is 1, an acyl group derived from an aliphatic or aromatic monocarboxylic acid,
  when $n$ is 2, a diacyl group derived from an aliphatic or aromatic monocarboxylic acid or carbonyl group,
  when $n$ is 3, a triacyl group derived from an aliphatic or aromatic tricarboxylic acid or a trivalent group obtained by eliminating three hydroxyl groups from phosphoric acid, phosphorous acid or boric acid, and
  when $n$ is 4, a tetraacyl group derived from an aromatic tetracarboxylic acid or a tetravalent group obtained by eliminating four hydroxyl groups from orthosilicic acid; provided that where $X_1$ is hydrogen atom, $n$ is 4 and, where $X_1$ is an alkyl group of 1 to 4 carbon atoms, $n$ is an integer of 1 through 4 inclusive.

In the above formulae (I) and (II), the alkyl group may be illustrated by methyl, ethyl, n-propyl, isopropyl, n-butyl and tert. butyl; the saturated alicyclic group by

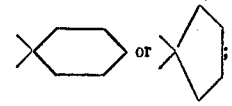

the aliphatic or aromatic acyl group derived from monocarboxylic acid by acetyl, propionyl, octanoyl, lauroyl, stearoyl and benzoyl and naphthoyl, the latter two groups being optionally substituted with such a substituent as halogen, alkyl, amino, hydroxy, alkoxy or nitro; the diacyl group derived from dicarboxylic acid by those groups derived from, e.g., oxalic acid, succinic acid, adipic acid, phthalic acid, isophthalic acid and terephathalic acid; the triacyl group derived from tricarboxylic acid by those groups derived from, e.g., tricarboxylic acid and benzenetricarboxylic acid; and the tetraacyl group derived from tetracarboxylic acid by those groups derived from, e.g., benzenetetracarboxylic acid.

The term "synthetic polymer" as used herein are intended to embrace polyolefins including homopolymers of olefins such as low-density and high-density polyethylene, polypropylene, polystyrene, polybutadiene, polyisoprene and the like, and copolymers of olefins with other ethylenically unsaturated monomers such as ethylene-propylene copolymer, ethylene-butene copolymer, ethylene-vinyl acetate copolymer, styrene-butadiene copolymer, acrylonitrile-styrene-butadiene copolymer and the like; polyvinyl chlorides and polyvinylidene chlorides including homopolymer of each of vinyl chloride and vinylidene chloride, vinyl chloride-vinylidene chloride copolymer and copolymers of each of vinyl chloride and vinylidene chloride with vinyl acetate or other ethylenically unsaturated monomers; polyacetals such as polyoxymethylene and polyoxyethylene; polyesters such as polyethylene terephthalate; polyamides such as 6-nylon, 6,6-nylon and 6,10-nylon; and polyurethanes.

Heretofore have been proposed in the art some piperidine derivatives which are related to the 4-piperidinol derivatives of the above formula (I) and useful as stabilizers for synthetic polymers, as represented by the following structure (see, for instance, Belgian Pat. No. 734,436 granted to Sankyo Company Limited, on Aug. 14, 1969):

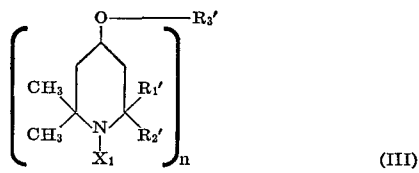

wherein $R_1'$ and $R_2'$ which may be the same or different, each are an alkyl group, or they form, together with the carbon atom to which they are attached, a saturated alicyclic group with 5 to 7 ring carbon atoms or a group of the formula

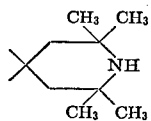

$n$ is an integer of 1 to 3 inclusive; and when $n$ is 1, $R_3'$ is an acyl group, a N-substituted carbamoyl group, a N-substituted thiocarbamoyl group, a monovalent group obtained by removing a hydroxyl group from an oxoacid, an alkyl group, a cycloalkyl group, an aralkyl group, an aryl group or a group of the general formula

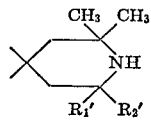

(wherein $R_1'$ and $R_2'$ are as defined above), when $n$ is 2, $R_3'$ is a diacyl group, a dicarbamoyl group, a bisthiocarbamoyl group, a carbonyl group, a divalent group obtained by removing two hydroxyl groups from an oxoacid, an alkylene group, an arylene group or arylenedialkylene group, and when $n$ is 3, $R_3'$ is a triacyl group, a tricarbamoyl group, a tristhiocarbamoyl group, a trivalent group obtained by removing three hydroxyl groups from an oxoacid, an alkanetriyl, an arenetriyl group or an arenetriyltrialkylene group.

Moreover, it is heretofore known that 4-benzoyloxy (or acetoxy)-2,2,6,6-tretamethylpiperidine encompassed within the above 4-piperidinol derivatives (I) is prepared by melting of 4-hydroxy-2,2,6,6-tetramethylpiperidine with benzoyl chloride or by reaction of these compounds in pyridine [see, Chemische Berichte, 45, 2060 (1912)]. But the melting method is not convenient for industrial application, since the hydrochloride formed will solidify in situ and can not be subjected to stirring.

The prior method which is effected by the use of pyridine results in a poor yield, for example, only about 50% and, moreover, the reaction product is colored and thus twice or even more recrystallizations should be made to obtain the desired product in a pure state.

As a result of our extensive studies to develop a new and commercially advantageous process for the preparation of the compounds having the above formula (I) in view of their usefulness, such as, for the stabilization of synthetic polymers, it has been unexpectedly found that the desired products (I) can be easily and advantageously prepared by the use of a smaller amount of a starting material and an inexpensive catalyst in so high yields as to be of about 80–95% and so highly pure crystal forms as to apply no further purification procedures such as recrystallization, according to the process of this invention which comprises reacting a 4-piperidinol derivative having the formula

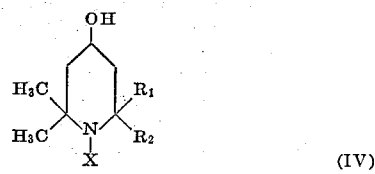

wherein $R_1$, $R_2$, and X have the same meanings as above with a lower alkyl ester of an acid having the formula $$R_3-(OR_4)_n \quad (V)$$

wherein $R_3$ and $n$ have the same meanings as above and $R_4$ is a lower alkyl group, e.g., methyl, ethyl or propyl in the presence of an alcoholysis catalyst. It has also been found that the process of this invention as described above is able to provide some new types of the acid esters of 4-piperidinol derivatives which were not available or difficult in their preparation by the prior methods depicted above.

As a further result of our studies, it has been found that the acid esters of 4-piperidinol derivatives (II) exhibit a potent stabilizing against photo- and thermal-deterioration of the synthetic polymers.

It is, accordingly, a primary object of this invention to provide a new and commercially advantageous process for the preparation of the 4-piperidinol derivative (I).

Another object is to provide synthetic polymer composition stabilized against the deterioration thereof by having incorporated therein a sufficient amount to prevent the deterioration of at least one of the 4-piperidinol derivatives (II).

Other objects and advantages of this invention will become apparent to those skilled in the art from the following description.

In one aspect of this invention, the compound having the above formula (I), as explained above, can be favorably produced through the reaction of the 4-piperidinol derivatives (IV) with the alkyl ester (V) in the presence of an alcoholysis catalyst.

In carrying out the process of this invention, the reaction may suitably proceed under such a condition that the alcohol ($R_4OH$) formed in situ by interesterification is distilled off from the reaction system. For this reason, organic solvents, such as toluene or xylene, having a higher boiling point than the alcohol ($R_4OH$) thus formed are preferably used as solvents. However, the reaction may also favourably proceed even in the absence of the solvent. The reaction may be preferably effected by intimately contacting thet piperidinol derivative (IV) with the alkyl ester (V) under heating in an equimolar amount. The alcoholysis catalyst which may be employed in the present process includes, for example, alkali-metals, alkoxides, hydrides, hydroxides and the like. The amount of the catalyst to be added is usually of about 0.01–0.5 mole.

It is to be noted that the present process is advantageous in a commercial scale, since favourable results can be obtained even by the use of alkali metal hydroxides, e.g., sodium or potassium hydroxide.

After the reaction, the desired product may be isolated as conventionally, for example, the reaction mixture is washed with water, dried, the solvent is distilled off and the residue is distilled in vacuo or a suitable solvent is added to the residue, thereby recovering the desired product.

Representative of the 4-piperidinol derivatives (II) which may be employed as a stabilizer are the following derivatives. However, it should be understood that these illustrated compounds are not intended to be limiting the scope of this invention.

| Compound No. | Chemical name |
| --- | --- |
| (1) | 4-acetoxy-2,2,6,6-tetramethylpiperidine. |
| (2) | 2,2,6,6-tetramethyl-4-octanoyloxypiperidine. |
| (3) | 4-lauroyloxy-2,2,6,6-tetramethylpiperidine. |
| (4) | 2,2,6,6-tetramethyl-4-stearoyloxypiperidine. |
| (5) | 4-benzoyloxy-2,2,6,6-tetramethylpiperidine. |
| (6) | 1-aza-4-benzoyloxy-2,2-dimethyl-spiro[5,5]undecane. |
| (7) | 1-aza-4-benzoyloxy-1,2,2-trimethyl-spiro[5,5]undecane. |
| (8) | 1,9-diaza-4-benzoyloxy-2,2,8,8,10,10-hexamethyl-spiro[5,5]-undecane. |
| (9) | 1,9-diaza-4-benzoyloxy-2,2,8,8,10,10-hexamethyl-spiro[5,5]-undecane-1,9-dioxyl. |
| (10) | 1,9-diaza-4-benzoyloxy-1,2,2,8,8,9,10,10-octamethyl-spiro[5,5]undecane. |
| (11) | 4-(p-chlorobenzoyloxy)-2,2,6,6-tetramethylpiperidine. |
| (12) | 4-(o-chlorobenzoyloxy)-2,2,6,6-tetramethylpiperidine. |
| (13) | 2,2,6,6-tetramethyl-4-p-toluoyloxypiperidine. |
| (14) | 4-(p-aminobenzoyloxy)-2,2,6,6-tetramethylpiperidine. |
| (15) | 4-(o-aminobenzoyloxy)-2,2,6,6-tetramethylpiperidine. |
| (16) | 2,2,6,6-tetramethyl-4-(β-naphthoyloxy)piperidine. |
| (17) | Bis(2,2,6,6-tetramethyl-4-piperidyl)-N,N'-dioxyl carbonate. |
| (18) | Bis(2,2,6,6-tetramethyl-4-piperidyl)-N,N'-dioxyl oxalate. |
| (19) | Bis(2,2,6,6-tetramethyl-4-piperidyl)-N,N'-dioxyl succinate. |
| (20) | Bis(2,2,6,6-tetrametoyl-4-piperidyl) adipate. |
| (21) | Bis(2,2,6,6-tetramethyl-4-piperidyl) thiodipropionate or, bis(2,2,6,6-tetramethyl-4-piperidyl) 3-thiapentane-1,5-dicarboxylate. |
| (22) | Bis(2,2,6,6-tetramethyl-4-piperidyl) terephthalate. |
| (23) | Bis(2,2,6,6-tetramethyl-4-piperidyl)-N,N'-dioxyl phthalate. |
| (24) | Tris(2,2,6,6-tetramethyl-1-oxyl-4-piperidyl) trimesitinate or, tris(2,2,6,6-tetramethyl-1-oxyl-4-piperidyl) 1,3,5-benzene tricarboxylate. |
| (25) | Tris(2,2,6-6-tetramethylpiperidyl) trimellitate. |
| (26) | tris(2,2,6,6-tetremethyl-4-piperidyl) phosphite. |
| (27) | tris(2,2,6,6-tetramethyl-4-piperidyl) phosphate. |
| (28) | tris(2,2,6,6-tetramethyl-4-piperidyl) borate. |
| (29) | Tetrakis(2,2,6,6-tetramethyl-4-piperidyl) pyromellitate. |
| (30) | Tetrakis(2,2,6,6-tetramethyl-1-oxyl-4-piperidyl) silicate. |
| (31) | 4-acetoxy-1,2,2,6,6-pentamethylpiperidine. |
| (32) | 4-decanolyoxy-1,2,2,6,6-pentamethylpiperidine. |
| (33) | 4-benzoyloxy-1,2,2,6,6-pentamethylpiperidine. |
| (34) | 4-benzoyloxy-1-n-butyl-2,2,6,6-tetramethylpiperidine. |
| (35) | 4-salicyloyloxy-2,2,6,6-tetramethylpiperidine. |
| (36) | 4-(2-hydroxy-4-octyloxybenzoyloxy)-2,2,6,6-tetramethylpiperidine. |
| (37) | 4-(3,5-di-tert.butyl-2-hydroxybenzoyloxy)-2,2,6,6-tetramethylpiperidine. |
| (38) | 1,2,2,6,6-pentamethyl-4-salicyloyloxy-piperidine. |
| (39) | 4-(3,5-di-tertbutyl-4-hydroxybenzoyloxy)-2,2,6,6-tetramethylpiperidine. |
| (40) | Bis(1,2,2,6,6-pentamethyl-4-piperidyl) succinate. |
| (41) | Bis(1,2,2,6,6-pentamethyl-4-piperidyl) adipate. |
| (42) | Bis(1,2,2,6,6-pentamethyl-4-piperidyl)3-thiapentane-1,5-dicarboxylate. |
| (43) | Bis(1,2,2,6,6-pentamethyl-4-piperidyl) terephthalate. |
| (44) | Bis(2,2,6,6-tetramethyl-4-piperidyl) 2-hydroxy-isophthalate. |
| (45) | tris(2,2,6,6-tetramethyl-4-piperidyl) tricarballylate. |
| (46) | tris(1,2,2,6,6-pentamethyl-4-piperidyl) trimellitate. |
| (47) | tris(1,2,2,6,6-pentamethyl-4-piperidyl) phosphate. |
| (48) | Tetrakis(1,2,2,6,6-pentamethyl-4-piperidyl) pyromellitate. |

In another aspect of this invention, there is provided a synthetic polymer composition stabilized against photo- and thermal-deterioration which contains at least one of the new 4-piperidinol derivatives (II) having incorporated therein.

The 4-piperidinol derivatives (II) employed as a stabilizer in the present invention may be readily incorporated into the synthetic polymers by any of the various standard procedures commonly utilized in the art. The stabilizer may be incorporated into the synthetic polymers at any desired stage prior to the manufacture of shaped articles therefrom. Thus, for example, the stabilizer in the form of a dry powder may be admixed with the synthetic polymer, or a suspension or emulsion of the stabilizer may be admixed with a solution, suspension or emulsion of the synthetic polymer.

The amount of the 4-piperidinol dartivatives (II) employed in the synthetic polymer in accordance with the present invention may be varied widely, depending upon the types, properties and particular uses of the synthetic polymer to be stabilized. In general, the 4-piperidinol derivatives (II) may be added in an amount ranging from 0.01 to 5.0% by weight, based on the amount of the synthetic polymer, but the practical range is varied depending upon the type of the synthetic polymer, that is 0.01 to 2.0% by weight, preferably 0.02 to 1.0% by weight for polyolefins, 0.01 to 1.0% by weight, preferably 0.02 to 0.5% by weight for polyvinyl chloride and polyvinylidene chloride, and 0.01 to 5.0% by weight, preferably 0.02 to 2.0% by weight for polyurethanes and polyamides.

The present stabilizer may be used alone or in combination with other known antioxidants, ultraviolet absorbents, fillers, pigments and the like.

If desired, two or more of the present stabilizers i.e. the 4-piperidinol derivatives (II) may also be satisfactorily used in this invention.

In order that the invention may be better understood, the following Examples are given solely for the purpose of illustration of this invention. In the Examples, all parts are given by weight unless otherwise indicated and the number of the test compound as used hereinbelow is the same as illustratively shown above.

Examples 1 through 27 describe the preparation of the 4-piperidinol derivatives (I).

Examples 28 through 32 describe the synthetic polymer compositions having incorporated therein the 4-piperidinol derivatives (II) and their stabilization effects

EXAMPLE 1

Into a soltuion consisting of 0.5 g. of metallic sodium, 20 ml. of ethanol and 200 ml. of xylene were added 26 g. of 4-hydroxy-2,2,6,6-tetramethylpiperidine and 25 g. of ethyl benzoate and the resulting mixture was heated at a bath temperature of about 140° C., until the ethanol started to be distilled. After distillation of the ethanol was completed, the bath temperature was maintained at 170° C. for two hours until the reaction was completed. After cooling, the solution was washed with water and concentrated. The residual crystals were recrystallized from petroleum benzine to give 36.6 g. of 4-benzoyloxy-2,2,6,6-tetramethylpiperidine as white crystals with a melting point of 94 to 95° C. Yield based on 4-hydroxy-2,2,6,6-tetramethylpiperidine was 84.6 percent.

Analysis.—Calculated for $C_{16}H_{23}NO_2$: C, 73.53%; H, 8.87%; N, 5.36%. Found: C, 73.44%; H, 8.80%; N, 5.39%.

I.R. spectra (Nujol mull): $\nu$ (c=o), 1718 cm.$^{-1}$.

Mass spectra: Molecular weight (calculated), 261; molecular ion peak, 261.

By using the same method as in Example 1, the following compounds were obtained from the corresponding secondary alcohol.

EXAMPLE 2

1-aza-4-benzoyloxy-2,2-dimethyl-spiro[5.5]undecane

Coloroless oily substance with a boiling point of 174–180° C./0.2 mm. Hg.

Analysis.—Calculated for $C_{19}H_{27}NO_2$: C, 75.71%; H, 9.03%; N, 4.65%. Found: C, 75.64%; H, 8.90%; N, 4.61%.

EXAMPLE 3

1-aza-4-benzoyloxy-1,2,2-trimethyl-spiro[5.5]undecane

Hydrochloride as white crystals with a melting point of 115 to 117° C.

Analysis.—Calculated for $C_{20}H_{29}NO_2 \cdot HCl$: C, 68.26%; H, 8.59%; N, 3.98%. Found: C, 68.18%; H, 8.61%; N, 3.88%.

EXAMPLE 4

1,9-diaza-4-benzoyloxy-1,2,2,8,8,9,10,10-octamethyl-spiro[5.5]undecane

Dihydrochloride as white crystals with a melting point of 204 to 206° C. (with decomposition).

*Analysis.*—Calculated for $C_{24}H_{38}N_2O_2 \cdot 2HCl \cdot H_2O$: C, 60.37%; H, 8.87%; N, 5.87%. Found: C, 60.26%; H, 8.89%; N, 5.80%.

EXAMPLE 5

Into a solution consisting of 0.3 g. of metallic sodium, 10 ml. of methanol and 200 ml. of xylene were added 27.1 g. of 4-hydroxy-2,2,6,6-tetramethylpiperidine and 22.4 g. of methyl benzoate and the bath temperature was elevated to about 140° C., until the methanol started to be distilled. After the methanol was distilled off, the bath temperature was maintained at 170° C. for one hour. After cooling, the reaction mixture was washed with water and concentrated. The residual crystals thus obtained were recrystallized from petroleum benzine to give 40.3 g. of 4-benzoyloxy-2,2,6,6-tetramethylpiperidine as white crystal with melting point of 94 to 95° C. Yield based on 4-hydroxy-2,2,6,6-tetramethylpiperidine was 93.2%. The product thus obtained showed no depression in its mixed melting point with the product obtained in Example 1. Moreover, the two products were identified by infrared absorption sepctra.

By using the same method as in Example 5, the following compounds were obtained from the corresponding secondary alcohols.

EXAMPLE 6

4-acetoxy-2,2,6,6,-tetramethylpiperidine

White crystal with a melting point of 124 to 125° C.

*Analysis.*—Calculated for $C_{11}H_{21}NO_2$: C, 66.29%; H, 10.62%; N, 7.03%. Found: C, 66.26%, H, 10.55%; N, 6.91%.

EXAMPLE 7

2,2,6,6-tetramethyl-4-(β-naphthoyloxy)piperidine

White crystals with melting point of 104 to 105° C.

*Analysis.*—Calculated for $C_{20}H_{25}NO_2$: C, 77.13%; H, 8.09%; N, 4.50%. Found: C, 77.07%; H, 8.22%; N, 4.37%.

EXAMPLE 8

Bis(2,2,6,6-tetramethyl-4-piperidyl)-N,N'-dioxyl carbonate

Pale pink crystals with a melting point of 183 to 185° C.

*Analysis.*—Calculated for $C_{19}H_{34}N_2O_5$: C, 61.59%; H, 9.25%; N, 7.56%. Found: C, 61.54%; H, 9.24%; N, 7.62%.

EXAMPLE 9

Bis(2,2,6,6-tetramethyl-4-piperidyl)-N,N'-dioxyl oxalate

Pale pink crystals with a melting point of 179° C.

*Analysis.*—Calculated for $C_{20}H_{34}N_2O_6$: C, 60.28%; H, 8.60; N, 7.03%. Found: C, 60.24%; H, 8.55%; N, 7.10%.

EXAMPLE 10

Bis(2,2,6,6-tetramethyl-4-piperidyl) terephthalate

White crystals with a melting point of 207 to 208° C.

*Analysis.*—Calculated for $C_{26}H_{40}N_2O_4$: C, 70.23%; H, 9.07%; N, 6.30%. Found: C, 70.22%; H, 9.00%; N, 6.23%.

EXAMPLE 11

Into a solution consisting of 26 g. of 4-hydroxy-2,2,6,6-tetramethylpiperidine, 25 g. of ethyl benzoate and 200 ml. of xylene was added 0.3 g. of sodium hydroxide powder. The mixture was then heated with stirring. The ethanol started to distill at the bath temperature of about 140° C. After the ethanol was distilled off, the bath temperature was maintained at 170° C. for two hours with stirring. Then, the solution thus obtained was treated in the same manner as shown in Example 5 to give 39.9 g. of 4-benzoyloxy-2,2,6,6-tetramethylpiperidine with a melting point of 94 to 95° C. Yield based on 4-hydroxy-2,2,6,6-tetramethylpiperidine was 92.3%. The product thus obtained showed no mixed melting point depression with the product obtained in Example 1. In addition, the two products were identified with infrared spectra absorption.

By using the same method as in Example 11, the following compounds were obtained from the corresponding secondary alcohols.

EXAMPLE 12

1,9-diaza-4-benzoyloxy-2,2,8,8,10,10-hexamethyl-spiro-[5.5]undecane

Dihydrochloride as white crystals with a melting point of 237 to 238° C. (with decomposition).

*Analysis.*—Calculated for $C_{22}H_{34}N_2O_2 \cdot 2HCl$: C, 61.27%, H, 8.41%; N, 6.50%. Found: C, 61.16%; H, 8.44%; N, 6.43%.

EXAMPLE 13

1,9-diaza-4-benzoyloxy-2,2,8,8,10,10-hexamethyl-spiro-[5.5]undecane-1,9-dioxyl

Pale orange crystals with a melting point of 177 to 179° C.

*Analysis.*—Calculated for $C_{22}H_{32}N_2O_4$: C, 68.01%; H, 8.30%; N, 7.21%. Found: C, 67.89%; H, 8.30%; N, 7.10%.

EXAMPLE 14

4-(p-chlorobenzoyloxy)-2,2,6,6-tetramethylpiperidine

White crystals with a melting point of 79.5 to 81° C.

*Analysis.*—Calculated for $C_{16}H_{22}NO_2Cl$: C, 64.97%; H, 7.50%; N, 4.76%. Found: C, 64.99%; H, 7.53%; N, 4.71%.

EXAMPLE 15

Tris(2,2,6,6-tetramethyl-4-piperidyl)phosphite

Colorless oily substances with a boiling point of 227 to 228° C./4 mm. Hg.

*Analysis.*—Calculated for $C_{27}H_{54}N_2O_3$: C, 64.86%; H, 10.80%; N, 8.41%. Found: C, 64.74%; H, 10.98%; N, 8.30%.

EXAMPLE 16

Tetrakis(2,2,6,6-tetramethyl-4-piperidyl) pyromellitate

White crystals with a melting point of 212° C.

*Analysis.*—Calculated for $C_{46}H_{74}N_4O_8$: C, 68.11%; H, 9.19%; N, 6.91%. Found: C, 68.04%; H, 9.25%; N, 6.80%.

I.R. absorption spectra (Nujoy mull): $\nu$ c=o, 1727 cm.$^{-1}$.

EXAMPLE 17

Tetrakis(2,2,6,6-tetramethyl-1-oxyl-4-piperidyl) silicate

Pale orange crystals with a melting point of 160 to 165° C.

*Analysis.*—Calculated for $C_{36}H_{68}N_4O_8Si$: C, 60.64%; H, 9.61%; N, 7.86%. Found: C, 60.52%; H, 9.55%; N, 7.80%.

EXAMPLE 18

Into a solution consisting of 15.7 g. of 4-hydroxy-2,2,6,6-tetramethylpiperidine, 22.8 g. of methyl stearate and 150 ml. of xylene was added 0.5 g. of potassium hydroxide powder and the mixture was heated for 10 hours with stirring. The methanol so produced was distilled off by a fractionating column equipped with the reaction vessel. After cooling, the solution was washed with water and dried over anhydrous sodium sulfate. After the solvent was distilled off, the residual solution was distilled under reduced pressure to give a colorless oily substance with a boiling point of 205 to 209° C./0.05 mm. Hg. This substance solidified by cooling and recrystallized from petroleum ether to give 33.2 g. of 2,2,6,6-tetramethyl-4-stearoyloxypiperidine as white crystals with a melting point of 85 to 86° C.

Analysis.—Calculated for $C_{27}H_{53}NO_2$: C, 76.53%; H, 12.61%; N, 3.31%. Found: C, 76.46%; H, 12.56%; N, 3.40%.

I.R. absorption spectra (Nujol mull): $\nu$ c=o, 1735 cm.$^{-1}$.

Mass spectra: Molecular weight (calculated), 423; molecular ion peak, 423.

By using the same method as in Example 18, the following compounds were obtained from the corresponding secondary alcohols.

EXAMPLE 19

Bis(2,2,6,6-tetramethyl-4-piperidyl)-N,N'-dioxyl phthalate

Pale orange crystals with a melting point of 155.5° C.
Analysis.—Calculated for $C_{26}H_{38}N_2O_6$: C, 65.80%; H, 8.07%; N, 5.90%. Found: C, 65.74%; H, 7.98%; N, 5.91%.

EXAMPLE 20

Tris(2,2,6,6-tetramethyl-1-oxy-4-piperidyl) trimesitinate

Pale orange crystals with a melting point of 208 to 209° C.
Analysis.—Calculated for $C_{36}H_{54}N_3O_9$: C, 64.26%; H, 8.09%; N, 6.25%. Found: C, 64.14%; H, 8.13%; N, 6.17%.

EXAMPLE 21

Into a solution consisting of 15.7 g. of 4-hydroxy-2,2,6,6-tetramethylpiperidine, 16.5 g. of ethyl benzoate and 150 ml. of xylene was added 0.5 g. of potassium hydroxide powder. The mixture was then heated with stirring. The ethanol started to distill at the liquid temperature of about 120° C. After the ethanol was distilled off, the solution was maintained at 140° C. for two hours with stirring. After cooling, the solution was washed with water and dried over anhydrous sodium sulfate and then the solvent was distilled off. The residue was distilled under reduced pressure to give a colorless oily substance with a boiling point of 181 to 183° C./0.1 mm. Hg. This substance solidified by cooling and then recrystallized from benzene to give 4-(p-aminobenzoyloxy)-2,2,6,6-tetramethylpiperidine as white crystal having a melting point of 149° C.

Analysis.—Calculated for $C_{16}H_{24}N_2O_3$: C, 69.53%; H, 8.75%; N, 10.14%. Found: C, 69.64%; H, 8.75%; N, 10.71%.

I.R. absorption spectra (Nujol mull): $\nu$ c=o, 1690 cm.$^{-1}$.

Mass spectra: Molecular weight (calculated), 276; molecular ion peak, 276.

By using the same method as in Example 21, the following compounds were obtained from the corresponding secondary alcohols.

EXAMPLE 22

Bis(2,2,6,6-tetramethyl-4-piperidyl)-N,N'-dioxyl succinate

Pale pink crystals with a melting point of 141° C.
Analysis.—Calculated for $C_{22}H_{38}N_2O_6$: C, 61.94%; H, 8.98%; N, 6.57%. Found: C, 61.86%; H, 9.05%; N, 6.50%.

EXAMPLE 23

Bis(2,2,6,6-tetramethyl-4-piperidyl) adipate

White crystals having a melting point of 87 to 88° C.
Analysis.—Calculated for $C_{24}H_{44}N_2O_4$: C, 67.88%; H, 10.45%; N, 6.60%. Found: C, 67.80%; H, 10.50%; N, 6.51%.

EXAMPLE 24

4-acetoxy-1,2,2,6,6-pentamethylpiperidine

Colorless oil with a boiling point of 88–90° C./1 mm. Hg.

Analysis.—Calculated for $C_{12}H_{23}NO_2$: C, 67.56%; H, 10.87%; N, 6.57%. Found: C, 67.39%; H, 10.85%; N, 6.61%.

EXAMPLE 25

4-benzoyloxy-1,2,2,6,6-pentamethylpiperidine

Colorless oil with a boiling point of 160° C./1.5 mm. Hg.

Analysis.—Calculated for $C_{17}H_{25}NO_2$: C, 74.14%; H, 9.15%; N, 5.09%. Found: C, 74.39%; H, 9.39%; N, 4.90%.

I.R. spectrum (liquid film): $\nu$ c=o, 1723 cm.$^{-1}$.

EXAMPLE 26

Tris(2,2,6,6-tetramethyl-4-piperidyl)phosphate

Colorless crystals (recrystallized from benzene) with a melting point of 131° C.
Analysis.—Calculated for $C_{27}H_{54}N_3O_4P$: C, 62.88%; H, 10.55%; N, 8.15%. Found: C, 62.72%; H, 10.46%; N, 8.23%.

I.R. spectrum (Nujol mull): $\nu$ p=o, 1267 cm.$^{-1}$.

EXAMPLE 27

A mixture of 15.7 g. of 4-hydroxy-2,2,6,6-tetramethylpiperidine, 18.2 g. of ethyl salicylate and 0.5 g. of potassium hydroxide was heated at 180–220° C., while ethanol was being distilled off. The residue was dissolved in 200 ml. of benzene. The resulting solution was washed with water, dried and the benzene was distilled off. The residue was recrystallized from petroleum benzine to give 2,2,6,6-tetramethyl-4-salicyloyloxypiperidine as white crystals with a melting point of 83–84° C.

Analysis.—Calculated for $C_{16}H_{23}NO_3$: C, 69.28%; H, 8.36%; N, 5.05%. Found: C, 69.23%; H, 8.33%; N, 4.94%.

I.R. spectrum (Nujol mull): $\nu_{oh}$, 3180 cm.$^{-1}$; $\nu$ c=o, 1660 cm.$^{-1}$.

EXAMPLE 28

Into 100 parts of polypropylene ["Noblen JHH—G," trade name, available from Mitsui Toatsu Chemicals Inc., Japan, employed after twice recrystallizations from monochlorobenzene] was incorporated 0.25 part of each of the test compounds of this invention indicated below. The resulting mixture was mixed and melted and then molded into a sheet having a thickness of 0.5 mm. under heating and pressure.

As a control for comparative purpose, the polypropylene sheet was prepared in a similar manner to that described above without any of stabilizers.

Then, all of these sheets thus formed were tested for the brittleness time (which means the time, expressed in terms of hour, until the test sheet becomes brittle) under ultraviolet ray irradiation at a temperature of 45° C. by means of the fade meter prescribed in Japanese Industrial Standard JIS–1044 entitled "Testing Method of Color Fastness to Light of Dyed Textiles and Dyestuffs," paragraph 3.8 (in English).

The results are given in the following Table 1.

TABLE 1

| Test compound No. | Brittleness time (hours) |
|---|---|
| 10 | 540 |
| 29 | 580 |
| 30 | 600 |
| 32 | 680 |
| 33 | 520 |
| 38 | 740 |
| 41 | 560 |
| 43 | 500 |
| 46 | 560 |
| 47 | 720 |
| 48 | 520 |
| None | 100 |

EXAMPLE 29

Into 100 parts of high-density polyethylene ["Hi-Zex," trade name, available from Mitsui Toatsu Chemicals Inc., Japan, employed after twice recrystallization from toluol] was incorporated 0.25 part of each of the test compounds of this invention indicated below. The resulting mixture was made into a sheet having a thickness of 0.5 mm. by the same procedure as in the above Example 28.

The sheet thus formed was tested for the brittleness time by the same test method as in the above Example 28. The results are given in the following Table 2.

TABLE 2

| Test compound No.: | Brittleness time (hours) |
|---|---|
| 29 | 1320 |
| 33 | 1420 |
| 38 | 1860 |
| 41 | 1400 |
| 47 | 1680 |
| 48 | 1280 |
| None | 400 |

EXAMPLE 30

Into 100 parts of 6-nylon ["CM 1011," trade name, available from Toray Industries Inc., Japan, containing no stabilizer] was incorporated 0.25 part of each of the test compounds of this invention indicated below. The resulting mixture was heated and melted and then molded into a film having a thickness of about 0.1 mm. under pressure by a conventional compression molding machine. The film thus formed was aged under the following aging condition and thereafter subjected to a tensile test to determine the retentions of tensile strength and elongation by a standard method.

Aging test (1) Exposure to ultraviolet ray for 300 hours in the fade meter described above at 45° C.

(2) Aging at 160° C. for 2 hours in a Geer's aging tester prescribed in Japanese Industrial Standard JIS–K–6301 entitled "Physical Testing Methods for Vulcanized Rubber," paragraph 6.5 (in English).

The results are given in the following Table 3.

TABLE 3

| Test compound number | Fade meter (after 300 hours) | | Geer's aging tester (2 hours, 160° C.) | |
|---|---|---|---|---|
| | Retention of elongation (percent) | Retention of tensile strength (percent) | Retention of elongation (percent) | Retention of tensile strength (percent) |
| 29 | 73 | 70 | 73 | +76 |
| 33 | 75 | 77 | 60 | 72 |
| 38 | 81 | 79 | 58 | 68 |
| 41 | 86 | 74 | 78 | 70 |
| None | 10 | 45 | 25 | 56 |

EXAMPLLE 31

Into 100 parts of polyurethane prepared from polycaprolactone ["E–5080," trade name, available from The Nippon Elastollan Industries Ltd., Japan] was incorporated 0.5 part of each of the test compounds of this invention indicated below. The resulting mixture was heated and melted and then molded into a sheet having a thickness of about 0.5 mm. The sheet thus formed was subjected to the exposure to ultraviolet ray for 15 hours in the fademeter as specified in the above Example 5 at 45° C. and then tested for the retentions of elongation and tensile strength as in the above Example 30.

The results are given in the following Table 4.

TABLE 4

| Test compound number | Retention of elongation (percent) | Retention of tensile strength (percent) |
|---|---|---|
| 29 | 85 | 80 |
| 33 | 87 | 76 |
| 38 | 84 | 88 |
| 40 | 89 | 92 |
| None | 76 | 44 |

EXAMPLLE 32

Into 100 parts of polyvinyl chloride ["Green 103 EP," trade name, available from The Japanese Geon Co., Ltd., Japan] were incorporated 1.0 part of lead stearate, 0.5 part of dibasic lead phosphite, 0.5 part of barium stearate, 0.5 part of cadmium stearate and 0.2 part of each of the test compounds of this invention indicated below. The resulting mixture was blended and kneaded for 4 minutes on a kneading roll to form a sheet having a thickness of 0.5 mm. The sheet was tested for the discoloration degree thereof by the aging test method set forth below.

Aging test (1) Exposure for 600 hours to the sunshine carbon apparatus prescribed in Japanese Industrial Standard JIS Z–0230 entitled "Accelerated Weathering Test of Rust Proofing Oils," paragraph 2.

(2) The sheet was aged for 90 minutes at 170° C. in the Geer's aging tester prescribed in the above Example 30.

The results are given in the following Table 5.

TABLE 5

| | Discoloration | |
|---|---|---|
| Test compound number | Sunshine carbon apparatus (after 600 hours) | Geer's aging tester (after 90 minutes, 170° C.) |
| 29 | Slightly yellowish | Slightly yellowish. |
| 32 | Yellow | Pale yellow. |
| 33 | Pale yellow | Do. |
| 43 | Slightly yellowish | Slightly yellowish. |
| None | Dark brown | Black. |

From the above results it can be seen that the 4-piperidinol derivatives (II) of this invention exhibit a high degree of stabilizing effect on synthetic polymers against deteriorations thereof.

What is claimed is:

1. A synthetic polymer composition stabilized against photo- and thermal-deterioration wherein there is incorporated, in a sufficient amount to prevent said deterioration, a 4-piperidinol compound having the formula $$\left[ \begin{array}{c} H_3C \\ H_3C \end{array} \underset{X_1}{\overset{O-R_3}{\underset{N}{\bigwedge}}} \begin{array}{c} R_1 \\ R_2 \end{array} \right]_n$$

wherein $R_1$ and $R_2$ may be the same or different and represent an alkyl group of 1 to 4 carbon atoms or they may form, together with the carbon atom to which they are attached, a saturated alicyclic group or the group of the formula $$\underset{CH_3}{\overset{CH_3}{\bigtimes}} \underset{CH_3}{\overset{CH_3}{\bigwedge}} N-X_1;$$

$X_1$ is hydrogen atom or an alkyl group of 1 to 4 carbon atoms;

$n$ is an integer of 1 through 4 inclusive; and $R_3$ represents, when n is 1, an acyl group derived from an aliphatic or aromatic monocarboxylic acid, when n is 2, a diacyl group derived from an aliphatic or aromatic dicarboxylic acid or carbonyl group, when n is 3, a triacyl group derived from an aliphatic or aromatic tricarboxylic acid or a trivalent group obtained by eliminating three hydroxyl groups from phosphoric acid, phosphorous acid or boric acid, and when n is 4, tetraacyl group derived from an aromatic tetracarboxylic acid or a tetravalent group obtained by eliminating four hydroxyl groups from orthosilicic acid; provided that where $X_1$ is hydrogen atom, n is 4 and, where $X_1$ is an alkyl group of 1 to 4 carbon atoms, n is an integer of 1 through 4 inclusive.

2. The synthetic polymer composition according to claim 1 wherein said 4-piperidinol compound is incorporated in an amount of 0.01–5.0% by weight, based upon the amount of the synthetic polymer.

3. The synthetic polymer composition according to claim 1 wherein said polymer is a polyolefin.

4. The synthetic polymer composition according to claim 1 wherein said polymer is a polyvinyl chloride.

5. The synthetic polymer composition according to claim 1 wherein said polymer is a polyurethane.

6. The synthetic polymer composition according to claim 1 wherein said polymer is a polyamide having recurring amide groups as integral parts of the main polymer chain.

7. The synthetic polymer composition according to claim 1 wherein said 4-piperidinol compound is selected from the group consisting of tetrakis (2,2,6,6-tetramethyl-4-piperidyl)pyromellitate,
4-benzolyloxy-1,2,2,6,6-pentamethyl-piperidine,
1,2,2,6,6-pentamethyl-4-salicyloyloxy-piperidine,
bis(1,2,2,6,6-pentamethyl-4-piperidyl) terephthalate,
tris(1,2,2,6,6-pentamethyl-4-piperidyl)trimellitate,
tris(1,2,2,6,6-pentamethyl-4-piperidyl) phosphate,
tetrakis(1,2,2,6,6-pentamethyl-4-piperidyl) pyromellitate,
4-decanoyloxy-1,2,2,6,6-pentamethylpiperidine,
bis(1,2,2,6,6-pentamethyl-4-piperidyl)succinate, and
bis(1,2,2,6,6-pentamethyl-4-piperidyl)adipate.

8. The synthetic polymer composition as claimed in claim 7, wherein said 4-piperidinol compound is incorporated in an amount of 0.01–5.0% by weight, based upon the amount of the synthetic polymer.

9. The synthetic polymer composition according to claim 1 wherein $R_1$ and $R_2$ are the same or different and represent an alkyl group of 1 to 4 carbon atoms or they form, together with the carbon atom to which they are attached, cyclohexane, cyclopentane or the group of the formula

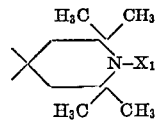

wherein
$X_1$ is hydrogen atom or an alkyl group of 1 to 4 carbon atoms;
n is an integer of 1 through 4 inclusive; and
$R_3$ represents, when n equals 1, acyl group derived from an aliphatic mono-carboxylic acid having from 2 to 18 carbon atoms or from benzoic or naphthalic acid being optionally substituted with halogen, alkyl, amino, hydroxy, alkoxy or nitro;
$R_3$ represents, when n equals 2, diacyl group derived from an aliphatic dicarboxylic acid having from 2 to 6 carbon atoms, phthalic acid, isophthalic acid or terephthalic acid or carbonyl group;
$R_3$ represents, when n equals 3, triacyl group derived from tricarballylic acid or benzene tricarboxylic acid;
$R_3$ represents, when n equals 4, tetraacyl group derived from benzene tetracarboxylic acid.

References Cited
UNITED STATES PATENTS

| | | | |
|---|---|---|---|
| 2,684,965 | 7/1954 | Weston et al. | 260—293.87 |
| 3,072,667 | 1/1963 | Meltzer et al. | 260—293.89 |
| 3,513,170 | 5/1970 | Murayama et al. | 260—45.8 |
| 3,640,928 | 2/1972 | Murayama et al. | 260—45.8 |

OTHER REFERENCES

Bolyard et al.: J.A.C.S., vol. 51, 1929, pp. 922 and 923.
McElvain et al.: Journal of the American Chemical Society, vol. 70, 1948, p. 1826.
Rozantsev et al.: Chemical Abstracts, vol. 64, 1966, 6782A.
Zhelyazkov et al.: Chemical Abstracts, vol. 60, 1964, 2881E.

DONALD E. CZAJA, Primary Examiner

R. A. WHITE, Assistant Examiner

U.S. Cl. X.R.

260—77.5 SS, 293.63, 293.66, 293.81, 293.88